United States Patent [19]
Koshiishi

[11] Patent Number: 4,733,303
[45] Date of Patent: Mar. 22, 1988

[54] FACSIMILE APPARATUS

[75] Inventor: Takaho Koshiishi, Tokyo, Japan

[73] Assignee: Ricoh Company, Ltd., Tokyo, Japan

[21] Appl. No.: 65,154

[22] Filed: Jun. 19, 1987

Related U.S. Application Data

[63] Continuation of Ser. No. 685,791, Dec. 24, 1984, abandoned.

[30] Foreign Application Priority Data

Dec. 26, 1983 [JP] Japan ................ 58-244273

[51] Int. Cl.⁴ .............................. H04N 1/32
[52] U.S. Cl. .................... 358/257; 358/286; 370/84; 375/121
[58] Field of Search ............ 358/256, 257, 286; 370/84; 375/121; 179/2 DP, 2 R

[56] References Cited

U.S. PATENT DOCUMENTS 4,524,393  6/1985  Ohzeki ........................... 358/257
4,583,124  4/1986  Tsuji et al. .................... 358/257

*Primary Examiner*—Edward L. Coles, Sr.
*Attorney, Agent, or Firm*—Oblon, Fisher, Spivak, McClelland & Maier

[57] ABSTRACT

A facsimile apparatus for shortening a period of time necessary for setting up a transmission modem rate set-up and, thereby, a period of time for which it occupies a line is disclosed. Every time the apparatus transmits video data to a remote apparatus, or destination, it stores a modem rate set up then. Later on, when the apparatus is to transmit another video data to the same destination, it searches for one of the stored past modem rates associated with the particular destination and corresponding in time to the present transmission.

12 Claims, 3 Drawing Figures

FACSIMILE APPARATUS

This application is a continuation of application Ser. No. 685,791, filed on Dec. 24, 1984, now abandoned.

BACKGROUND OF THE INVENTION

The present invention relates to a facsimile apparatus capable of shortening a period of time necessary for setting up a transmission modem rate and, thereby, a period of time over which it occupies a transmission line.

Generally, a facsimile apparatus is operated in conformity to a transmission control procedure (Recommendation T.30) standardized by CCITT (Consultative Committee of International Telegraph and Telephone). The transmission control procedure is roughly made up of five sequential phases: phase A for setting up a call, phase B for confirming functions and others of a terminal before transmitting video data, phase C for transmitting video data, phase D for confirming continuation of the transmission condition after the transmission of video data, and phase E for disconnection.

In the phase B mentioned above, a modem rate for the transmission of video data is also set up. Specifically, an apparatus at a calling station performs modem training with an apparatus at a called station, starting with the maximum modem rate (e.g. 9600 bits per second). When the calling apparatus has failed to train the called apparatus at the maximum modem rate, it repeats modem training while sequentially shifting down the modem rate, thereby determining a usable modem rate. Such modem rate set-up is dependent upon the condition of the line interconnecting the calling and called stations and, usually, a relatively high modem rate is set up if the line is well conditioned. A transmission control procedure signal per ce is transmitted at a rate as low as 300 bits per second which insures transmission with no regard to the line condition.

Meanwhile, in the case where a calling station knows an upper limit of modem rates assigned to a remote station, which it intends to call, through the past communications with the latter and/or a line condition is approximately presumable from the traffic in a particular time zone chosen for transmission, the calling station to some extent can select an adequate modem rate relying on such known and presumable information. In addition, where the call is meant particularly for an overseas station, it is possible to determine to a certain degree an adequate modem rate taking the season into account since the line condition in some measure is dependent upon the season.

As described above, considering a particular remote station and the dates or times of past communications therewith will enable a calling station to select a usable modem rate to a certain degree. Nevertheless, since the prior art apparatus starts modem training at the maximum modem rate as previously discussed, it inevitably consumes an extra time in setting up a modem rate. Such is reflected by an increase in the period of time for which the calling station occupies the line and, therefore, in transmission cost.

SUMMARY OF THE INVENTION

It is therefore an object of the present invention to provide a facsimile apparatus which saves a time period necessary for setting up a modem rate and, thereby, a line occupation time.

It is another object of the present invention to provide a generally improved facsimile apparatus.

In one aspect of the present invention, there is provided a facsimile apparatus comprising a storage for storing sequentially and destination by destination transmission mode data associated with past transmissions of video data, a setting device for setting up a transmission mode for transmitting video data to any selected destination by referencing the stored transmission mode data associated with the selected destination, and an updating device for updating the transmission mode data associated with the selected destination.

In another aspect of the present invention, there is provided a facsimile apparatus comprising a storage for storing sequentially and destination by destination times at which video data are transmitted and modem rates which are set up for the respective transmission, a setting device for setting a modem rate for transmitting video data to any selected destination by selecting one of the stored modem rates associated with the past transmissions which is substantially coincident in time with a present transmission, and an updating device for updating the stored transmission modem rates associated with the selected destination.

In accordance with the present invention, a facsimile apparatus for shortening a period of time necessary for setting up a transmission modem rate set-up and, thereby, a period of time for which it occupies a line is disclosed. Every time the apparatus transmits video data to a remote apparatus, or destination, it stores a modem rate set up then. Later on, when the apparatus is to transmit another video data to the same destination, it searches for one of the stored past modem rates associated with the particular destination and corresponding in time to the present transmission.

The above and other objects, features and advantages of the present invention will become apparent from the following detailed description taken with the accompanying drawings.

DESCRIPTION OF THE PREFERRED EMBODIMENT

While the facsimile apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
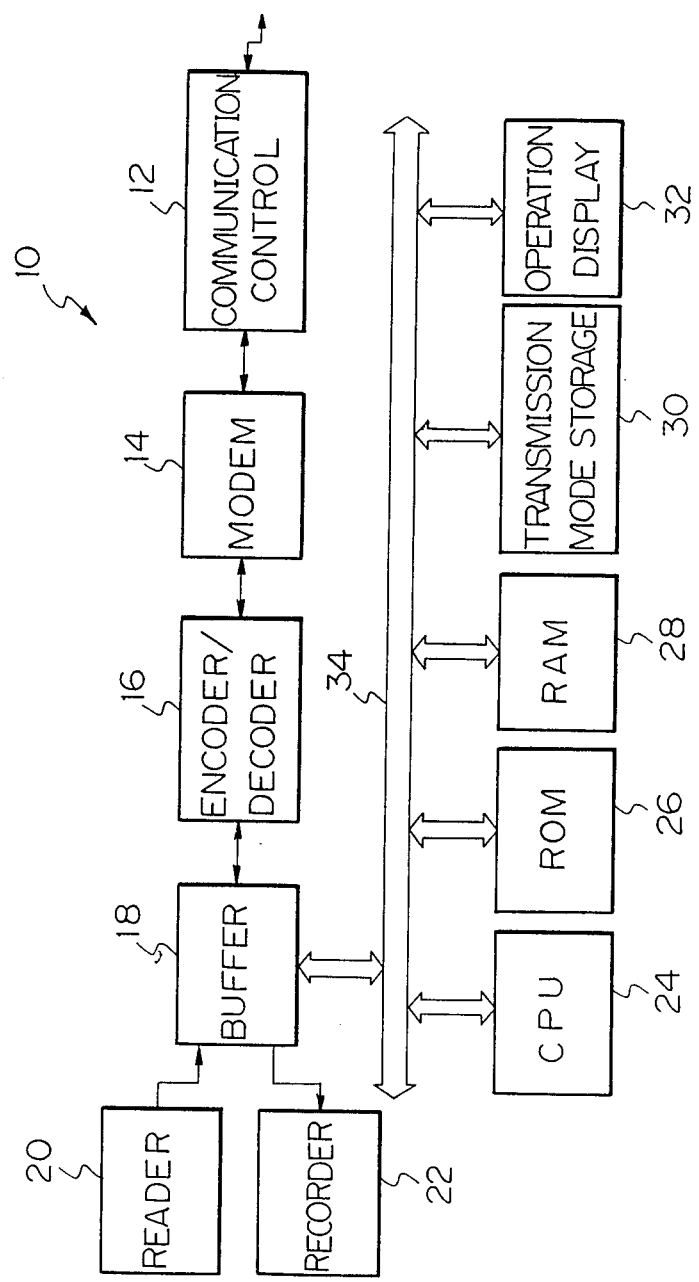
FIG. 1 is a block diagram of a facsimile apparatus embodying the present invention.

Referring to FIG. 1 of the drawings, a facsimile apparatus in accordance with the present invention is shown and generally designated by the reference numeral 10. As shown, the facsimile apparatus 10 includes a communication control unit 12 for executing a predetermined transmission procedure with a remote apparatus over a switching network (not shown), a modem 14 for modulating video data to be transmitted and demodulating received video data, an encoder/decoder 16 for encoding a video signal to be transmitted and decoding a received video signal, a buffer 18, a reader 20 for transforming images on a desired document into video signals, and a recorder 22 for recording received images. The apparatus 10 further includes a central processing unit (CPU) 24 for controlling the operation timings and modes of various sections of the apparatus, a read only memory (ROM) 26 for storing a control program assigned to the CPU 24, a random access memory (RAM) 28 for providing a work area for the CPU 24 and the like, a transmission mode storage 30 for storing transmission mode data destination by destination, an operation input section 32 furnished with displays and input means necessary for operator's manipulations, and a system bus line 34 for interconnecting the various elements mentioned.

Figure 2:
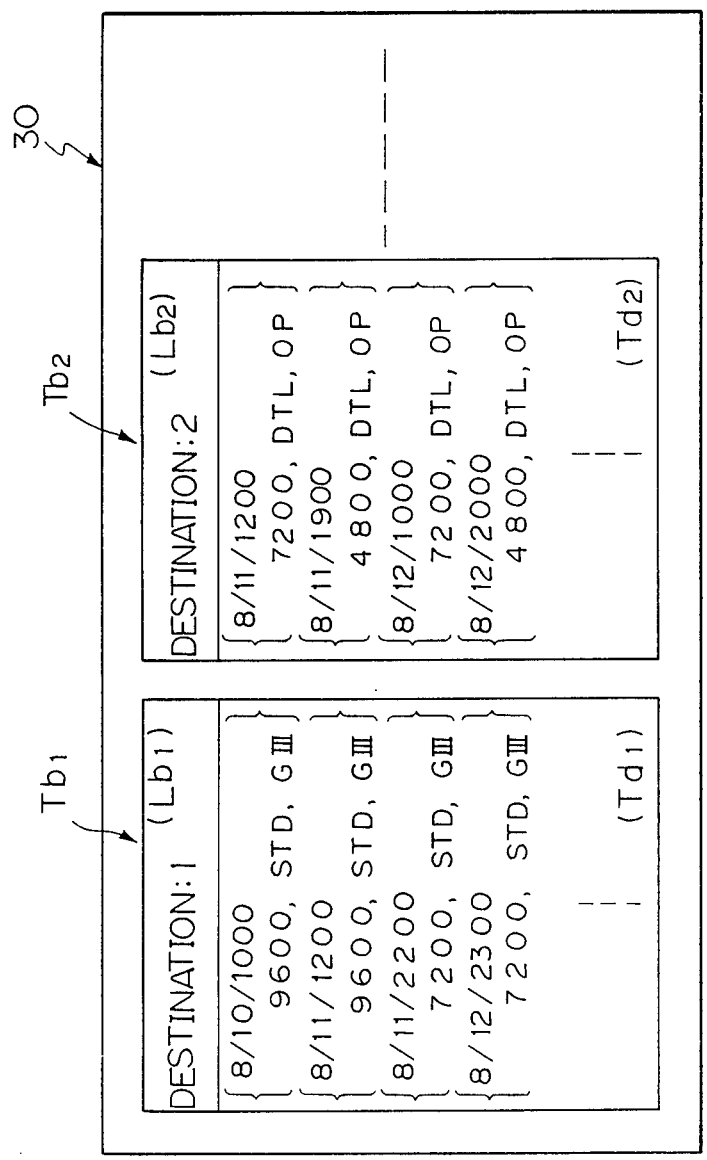
FIG. 2 shows examples of data stored in a transmission mode storage included in the apparatus of FIG. 1.

Referring to FIG. 2, there is shown exemplary data which are stored in the transmission mode storage 30. The storage 30 manages transmission mode data as tables $Tb_1$, $Tb_2$, ... which are associated with destinations in one-to-one correspondence. The table $Tb_1$ comprises a destination label $LB_1$ and a transmission mode data table $Td_1$. All the other tables $Tb_2$ ... are identical in format with the table $Tb_1$.

The transmission mode data table $Td_1$ has a capacity large enough to store a predetermined number of transmission mode data sets each of which comprises, as enclosed by brackets { } in FIG. 2, a time of transmission, a modem rate, a pixel density and a transmission procedure type. For example, the first data set in the transmission mode data table $Td_1$ shows that a transmission occurred on August 10, 10 o'clock, at a modem rate of 9600 bits per second, in a standard pixel density STD (8×3.85 dots per millimeter), and in the GIII standard transmission procedure. The other possible modem rates are 7200 and 4800 bits per second. Another possible pixel density is the double pixel density DTL (8.77×dots per millimeter). Further, another possible transmission procedure is a nonstandard or optional procedure OP.

The tables $Tb_1$, $Tb_2$, ... are updated every time the apparatus 10 sends video data to their associated destinations and, when any of the tables $Tb_1$, $Tb_2$, ... becomes full, the oldest transmission mode data stored therein is automatically discarded. Hence, the content of each of the tables $Tb_1$, $Tb_2$... is always updated in conformity to the season.

Figure 3:
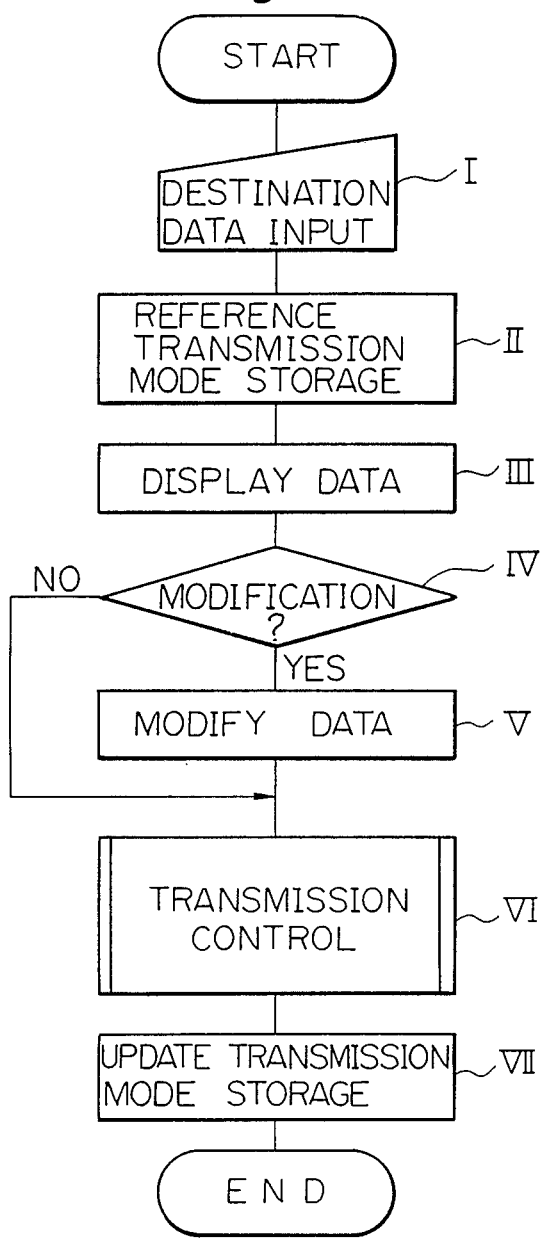
FIG. 3 is a flowchart demonstrating a control procedure in accordance with the present inention.

Reference will be made to FIG. 3 for describing the operation of the apparatus 10 for transmitting video data to a desired destination. As the operator loads the reader 20 with a document and, then, enters data representative of a desired remote station (e.g. telephone number or abbreviated dialing) through the operation input section 32 (manual operation I), the CPU 24 references the transmission mode storage 30 to read a transmission mode data out of one of the tables $Tb_1$, $Tb_2$, ... which is associated with the particular destination (processing II) and, then, displays it on the operation display 32 (processing III).

In detail, in the processing II, the CPU 24 reads present time from a callendar section (not shown) so as to search for transmission mode data which contains a time coincident with the present time. If any of the stored transmission mode data coincides in time, the CPU 24 reads out the whole content of that particular transmission mode data. If none coincides, the CPU 24 sees if any of the transmission mode data include times which are just before and just after the preset time and, if the answer is positive, reads modem rate data contained in those transmission mode data. If the modem rate data read out are the same, the CPU 24 adopts it for the present transmission and displays it. On the other hand, if the modem rates in the specific transmission mode data differ from each other, the CPU 24 checks the other transmission mode data around the above-mentioned particular one to search for the most frequently set up modem rate and adopts it while displaying it.

The operator, watching the display, may suitably modify the transmission mode data if necessary. In response to the optional modification (the result of decision IV is YES), the CPU 24 modifies the displayed data (processing V). As the operator depresses a start key of the apparatus 10, the CPU 24 sets the display data in necessary elements (e.g. reader 20, modem 14, communication control 12, etc.) and, then, starts on a transmission control (processing VI). Upon completing the transmission control, the CPU 24 updates the above-mentioned transmission mode table with the transmission mode set up this time, i.e. data having been displayed. The transmission control and the operations of the other sections of the apparatus 10 are the same as those of a prior art apparatus and, therefore, detailed description thereof will be omitted for simplicity.

The modem rate set-up in the processing II may be effected with any other suitable principle. For example, a day may be divided into "morning", "day", "evening" and "night". In such a case, past transmission mode data belonging to the same zone as the present transmission will be searched for and, if one them shares the same time zone with the present transmission, a modem rate contained therein will be set up for the present transmission while, if a plurality of them do so, then the most frequently set modem rate.

In summary, it will be seen that the present invention provides a facsimile apparatus which saves time necessary for modem training and, thereby, shortens the line occupation time to promote cost-effective transmissions of video data. This advantage is derived from the fact that the apparatus sets up a modem rate which matches with a particular destination and a particulat time of transmission on the basis of the past transmission data.

Various modifications will become apparent for those skilled in the art after receiving the teachings of the present disclosure without departing from the scope thereof.

What is claimed is:

1. A facsimile apparatus comprising:
    storage means for storing sequentially and destination by destination transmission mode data associated with past transmissions of video data including the time of day and the date of transmission;
    setting means for setting up a transmission mode responsive to said stored information, for transmitting video data to any selected destination by referencing the stored transmission mode data associated with the selected destination; and
    updating means for updating the transmission mode data associated with the selected destination.

2. A facsimile apparatus as claimed in claim 1, wherein the transmission mode data comprises a transmission modem rate.

3. A facsimile apparatus as claimed in claim 2, wherein the transmission mode data further comprises at least one of a time of transmission, a pixel density and a transmission procedure type.

4. A facsimile apparatus as claimed in claim 3, wherein the pixel density comprises at least one of a standard pixel density (8×385 dots per millimeter) and a double pixel density (8×7.7 dots per millimeter).

5. A facsimile appartus as claimed in claim 3, wherein the transmission procedure type comprises at least one of a standard transmission procedure type and an optional transmission procedure type.

6. A facsimile apparatus as claimed in claim 1, wherein the setting means is constructed to select one of the stored transmission mode data which represents a past transmission substantially coincident in time with a present transmission, adopting the selected transmission mode as a transmission mode for the present transmission to the selected destination.

7. A facsimile apparatus as claimed in claim 6, wherein the transmission mode comprises a modem rate.

8. A facsimile apparatus as claimed in claim 6, wherein the condition of the present transmission comprises a time of transmission.

9. A facsimile apparatus as claimed in claim 8, wherein the time of transmission belongs to one of "morning", "day", "evening" and "night" of a day.

10. A facsimile apparatus as claimed in claim 1, wherein the transmission mode data associated with the selected destination are updated every time a transmission of video data thereto is completed.

11. A facsimile apparatus comprising:
storage means for storing sequentially and destination by destination times at which video data are transmitted and modem rates which are set up for the respective transmissions including the time of day and the date of transmission;
setting means for setting a modem rate responsive to said stored information, for transmitting video data to any selected destination by selecting one of the stored modem rates associated with the past transmissions which is substantially coincident in time with a present transmission; and
updating means for updating the stored transmission modem rates associated with the selected destination.

12. A facsimile apparatus as claimed in claim 11, wherein the transmission mode data associated with the selected destination are updated every time a transmission of video data thereto is completed.

* * * * *